Jan. 30, 1968    R. E. KENNEL    3,366,392
PISTON SEAL
Filed Sept. 16, 1964

INVENTOR.
ROBERT E. KENNEL
BY John B. Sowell
ATTORNEY

United States Patent Office 3,366,392
Patented Jan. 30, 1968

3,366,392
PISTON SEAL
Robert E. Kennel, Grosse Pointe Park, Mich., assignor to The Budd Company, Philadelphia, Pa., a corporation of Pennsylvania
Filed Sept. 16, 1964, Ser. No. 396,896
2 Claims. (Cl. 277—177)

This invention relates to an annular or ring pressure seal for axially movable pistons and more particularly to a novel pressure seal for the actuating piston of disc brake wheel cylinders.

Most fixed caliper disc brakes employ retractors on the actuating piston and/or the brake shoes so as to provide a space or clearance between the shoes and the brake disc when the brakes are not in use. Such devices have been found to induce excessive pedal travel that must be compensated for by hydraulic boosters or servomechanisms. As an alternative to the use of boosters the brake shoes may be normally urged by light pressure into contact with the rotating brake disc as shown and described in application Serial No. 248,004, filed 28 December 1962, for "Split Housing Disc Brake." When the shoes of a disc brake are normally urged into contact with the rotating disc it is necessary that the force of engagement be very light so that the braking or wear effect is completely negligible. Lip seals and rectangular seals, as usually employed, create excessive friction between the piston bore and the piston if the seal is sufficiently tight to seal both high and low hydraulic pressures. The necessity for a tight seal creates difficulty in obtaining a consistent light pressure on the brake shoes.

Heretofore, piston seals mounted on the actuating piston have had a distinct tendency to climb or creep along the piston bore when hydraulic pressure is being applied and when the pressure is released the seal normally urges the actuating piston and/or the brake shoes into engagement with the rotating brake disc. In extreme cases the seals have been known to lock the brakes in an operative condition.

It is almost impossible to manufacture economically a brake disc that is radially flat and will remain flat under operating conditions. This lack of flatness of the brake disc causes the shoes and the actuating pistons to move, thus inducing wear of the piston seal. In some instances this movement will pump either fluid or air past the seal.

Therefore it is a general object of the present invention to provide an improved low friction pressure ring seal for a disc brake actuating piston.

It is another object of the present invention to provide a piston seal that avoids pumping of air or fluid due to axial vibrations.

It is another object of the present invention to provide a piston seal that is substantially free from wear due to axial vibrations.

It is another object of the present invention to provide a novel pressure operated U-ring seal that deflects and distorts under pressure so as to eliminate any tendency to creep in the piston bore or to lock the actuating piston in the bore.

In accordance with the invention there is provided a cylindrical-shaped piston slidingly fitted into a cylindrical surface piston bore, an annular rectangular groove is provided in the cylindrical-shaped piston to receive a resilient annular pressure seal having an axial thickness less than the width of said annular groove; the pressure seal is provided with substantially flat radial side surfaces adapted to engage the radial annular sides of said groove; the inside surface of the pressure seal is provided with a pair of radially inwardly directed leg portions extending from said side surfaces and connected by a raised concave arch; the outside diameter of the bottom of the annular groove is greater than the inside diameter of the pressure seal so that the leg portions are engaged in tension with the bottom of said annular rectangular groove; the pressure seal is further provided with a convex outside surface having a U-shape with a rounded crown; the outside diameter of the pressure seal in the annular groove is greater than the inside diameter of the cylindrical piston bore so that the outside surface of the seal is forced inwardly bending the pressure seal at its center, virtually eliminating said concave arch between said leg portions of said inside surface, and providing a pressure seal which will be formed under hydraulic pressure to engage in face-to-face contact with the bottom and one side of said annular groove and to engage in face-to-face contact between one side of said U-shape of said convex outside surface and the piston bore.

Other features and objects of the invention will be found throughout the more detailed description of the invention which follows.

To more clearly portray the invention and its manner of operation the description is supplemented with the accompanying drawings wherein.

Figure 4:
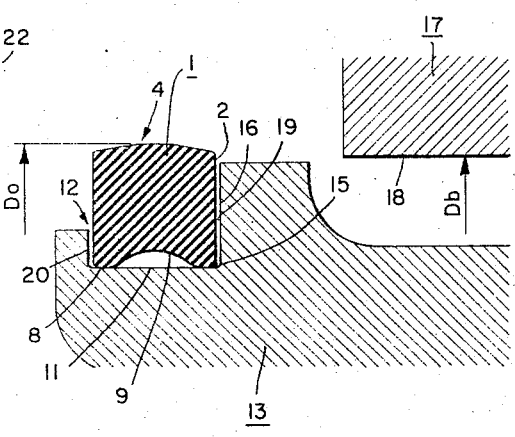
FIG. 4 is an enlarged elevation in section of detail 4 of FIG. 3 showing the piston seal outside of the piston bore.

In FIGS. 1 to 6 there is illustrated a preferred embodiment of the invention which is particularly suited for the environment of a disc brake wheel cylinder. The piston seal 1 is both resilient and flexible, being preferably molded of rubber or rubber-like synthetic material. In its natural molded state the seal is provided with radial side surfaces 2 and 3, an outside surface 4 comprising inclined surfaces 5, and terminating in a round crown 6. The inner surface 7 comprises a pair of radially inwardly extending leg portions 8 connected by a raised rounded arch 9. The inside diameter $Di$ of the radially inwardly directed leg portions is smaller than the diameter of the bottom surface 11 of the annular groove 12 in the piston 13, thus, the piston seal is stretched or in tension when mounted in the groove 12, as shown in FIG. 4. Also the axial thickness of the piston seal is smaller than the width of the annular groove 12, so that the piston seal is free to move axially a limited amount in the groove. The radially inwardly directed leg portions are provided with a round edge 14 having a larger radius than the inside corners 15 of the annular rectangular groove 12 to permit face-to-face engagement of radial side surface 2 with the radial side 16 of the annular groove 12.

It will be noted in FIG. 4 that even though the piston seal 1 is in tension that the shape of the raised rounded arch 9 is substantially unaffected and that the radial side surfaces 2 and 3 remain parallel to each other and to the radial side surfaces of the annular groove 12. The outside diameter $Do$ of the piston seal 1 in the groove 12 is larger than the inside diameter $Db$ of the piston bore 17. When the piston seal 1 is now placed inside the piston bore 17 so that the rounded crown 6 of the outside surface is in contact with the cylindrical inside surface 18 of the piston bore 17, the center portion of piston seal 1 is forced radially inward, virtually eliminating the raised rounded arch 9 without compressing the piston seal 1. More specifically, the piston seal 1 may be viewed as a deflected beam supported at its ends by the radially inwardly directed leg portions 8 and having a load applied at the rounded crown 6. In the preferred operation of the present invention there is a slight clearance between the modified arch 9' and the bottom 11 of the annular groove 12, thus, assuring that a seal is present between the rounded crown 6 and the cylindrical inside surface 18 and the radially inwardly directed leg portions 8 and the bottom 11 of the annular groove 12. If the modified arch 9' is eliminated, the piston seal 1 is compressed between the cylindrical surface 18 and the bottom 11 of the annular groove 12 creating undesired forces as well as causing the radial side surfaces 2 and 3 of the piston seal 1 to loose their flatness. The present invention intentionally avoids distortion of the side surface 2 of the piston seal due to radial compressive forces. It is believed that distortion of the radial side surface 2 would cause piston 13 to creep in the piston bore when the brakes are applied, then after the brakes are released the piston 13 would normally urge the brake shoes into engagement with the brake disc.

Figure 5:
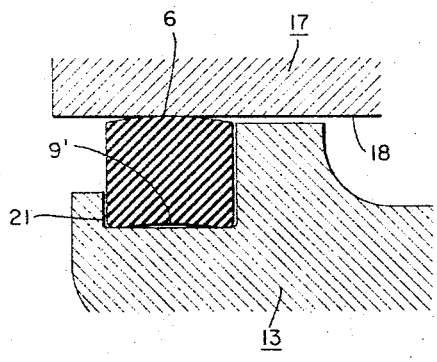
FIG. 5 is an elevation in section showing the piston seal of FIG. 4 inside the piston bore.

FIGS. 4 and 5 illustrate the preferred embodiment of the piston seal 1 before any hydraulic pressure has been applied. For purposes of illustration a clearance 19 is shown between the radial side surface 2 of seal 1 and the radial side 16 of annular groove 12. It will be understood from the following explanation that the seal 1 will seat flush against the radial side 16 under ordinary operating conditions and will tend to maintain this flush condition after the brakes are released.

When the brakes are applied, hydraulic pressure P is exerted upon the rear side surface 3 of the piston seal 1, forcing radial side surface 2 against radial side 16 of annular groove 12 causing seal 1 to distort, closing off the modified arch 9'. The inner surface 7' and the radial side surface 2 of the seal 1 make face-to-face contact with the bottom 11 and side 16, respectively, of the annular groove 12. Thereafter, the outside surface 4 of the seal 1 is distorted radially inward at the surface 3 and distorted radially outward at the surface 2 so that approximately half of the U-shaped seal is in face-to-face contact with the cylindrical inside surface 18 of the piston bore 17. It will be noted from FIG. 6 that the distortion pattern tends to rotate the U-shaped surface into contact with the bore and that the seal does not slide or creep along the bore to bite or grip the cylindrical surface 18. Thus, when the brake pressure is released, the piston seal 1 will return to its normal shape in the same rotational mode without tending to exert a forwardly directed force up on piston 13. The outside surface 4 of the seal 1 has effectively formed a high-pressure seal but not by creeping or sliding axially in the piston bore. This feature of the seal avoids wear, does not deposit particles in the bore and will seal even though some contaminating particles are present.

Figure 6:
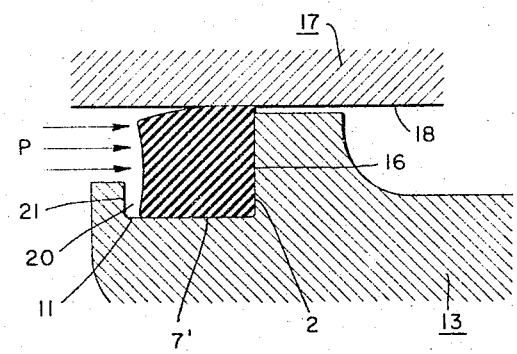
FIG. 6 is an elevation in section of the piston seal of FIG. 5 illustrating the deformation pattern due to the application of hydraulic pressure behind the piston seal.

As pressurized seal 1, shown in FIG. 6, returns to the shape shown in FIG. 5, the space 20 becomes smaller and the rear leg 8 moves rearwardly locating the center of the seal 1 as before without exerting forward pressure on the piston 13. The sliding action of rear leg 8 always assures that the bottom 11 of the annular groove 12 is sufficiently lubricated to form a pressure seal, thus, avoiding pumping of fluid or air past the seal. Any hydraulic sliding action of rear leg 8 in the bottom of the annular groove 12 cannot exert a forward force on the piston 13 due to creep of the inside surface 7 of the seal.

Figure 1:
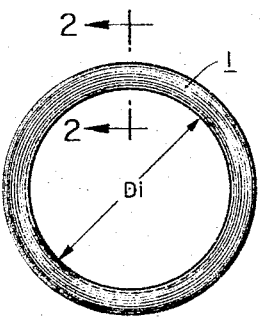
FIG. 1 is a side elevation of the novel piston seal.
Figure 2:
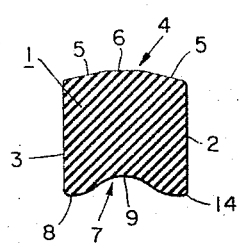
FIG. 2 is a section in elevation taken at lines 2—2 of FIG. 1.

In the embodiment shown, FIG. 2 illustrates the relative depth of the concave arch 9 and the height of the convex surface 4. Preferably, the arch 9 is about 15% to 30% of the cross-sectional depth and the convex surface 4 is slightly less in height than the concave arch. In the preferred embodiment the radial side 21 of the annular groove 12 is shorter than the radial side 16 to permit the hydraulic fluid to act on the side surface 3 before any appreciable pressure build-up can occur at inclined surface 5 that would permit leakage past the crown 6.

The most severe test that can be given a piston seal of the present type is in a disc brake wherein the brake shoes 22 are normally urged by light pressure of the actuating piston into contact with the rotating brake disc. Any ripple or lack of flatness in the brake disc is thus transmitted through the shoes and to the actuating piston thus vibrating axially the piston seal. Should this condition occur, the novel seal hereinbefore described has a tendency to distort rather than to slide axially in the bore, and if the axial movement is severe the seal will be moved without excessive wear to a new position where the piston can vibrate axially without again moving the seal.

With the piston seal 1 normally seated in the annular groove 12, the points of sealing contact are at legs 8 and crown 6. Any rearward motion exerted on piston 13 is transmitted to piston seal 1 so that the resisting force is exerted at the crown 6. The force thus exerted on radial side surface 2 of piston seal 1 causes a rotational distortion pattern which is analogous to pressure P acting on radial side surface 3. Thus it is seen that even with the axial vibration force applied the novel piston seal has a tendency to distort so as to avoid wear between the outside surface 4 and the cylindrical surface 18 of the bore 17.

Figure 7:
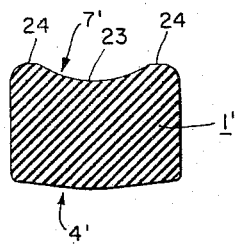
FIG. 7 is an elevation in section of a modified piston seal.
Figure 3:
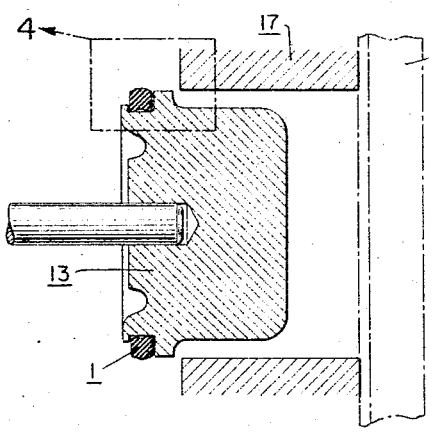
FIG. 3 is a partial section of a disc brake piston and housing showing a preferred embodiment of the present invention.

FIG. 7 is a modified embodiment adapted to fit into an annular groove in a piston bore. The modified embodiment of the piston seal 1 is provided with a constant radius arch 23 extending between the legs 24. Also the axial width of the seal 1' is greater than seal 1 of the preferred embodiment. Extending the width of the seal has the effect of creating a longer beam or distance between legs 24 which is more easily deflected by the radially outward force but creates a larger surface contact area 4'.

While the illustrated embodiments of the present invention have been shown with inclined surfaces 5 and rounded crown surfaces 6, it is to be understood that slight modifications of the outside surface could be made and still obtain the operating principle as explained with regard to FIGS. 5 and 6. Also it should be understood that minor modifications of the arch 9 and leg portions 8 could be made within the teaching of the present invention, and that the operating principle explained with regard to FIG. 5 could still be maintained if the seal diameter and the bottom of the annular groove are virtually the same because the force applied at the crown 6 can be made sufficient to bend the seal and form the necessary seal at the leg portions 8. Having thus explained the novel features of the illustrated embodiments and explained the superiority of the principles involved in the novel seal and the cooperation of the piston structure, many equivalents will suggest themselves to those skilled in the art. It is accordingly desired that the appended claims be given a broad interpretation commensurate with the scope of the invention.

What is claimed is:

1. In combination, a cylindrical piston bore; a cylindrical piston positioned within said bore and spaced therefrom, said piston having a uniform annular rectangular groove formed on the outer surface thereof, said groove having radial parallel side walls wherein one side wall is shorter than the opposite side wall and a flat annular base connecting said side walls; and a resilient circular seal positioned in said groove and contacting said bore for effectively forming an hydraulic fluid seal; said seal having a generally rectangular cross section and including a pair of substantially flat radial side surfaces positioned adjacent and spaced from said side walls of said groove, an inner face extending between said side surfaces contacting said base of said groove having a centrally positioned concave arch surface, a pair of leg portions in the same plane and parallel to the base of said groove connecting said concave surface with the respective side surfaces, an outer face extending between said side surfaces engaging said piston bore and having in its free state a convexly curved central surface, a pair of straight sloped surfaces connecting said curved surface with the respective side surfaces, wherein the unstressed diameter of said leg portions of said seal is less than the diameter of said base of said groove whereby said resilient seal will exert a biasing force against the base when mounted in the groove; and wherein the outer diameter of said convex surface is greater than the diameter of said bore whereby a compressive force is exerted on said seal when said seal and said piston are positioned in said bore.

2. The apparatus as claimed in claim 1 wherein said concave surface extends radially less than 30% the radial thickness of said seal and said convex surface extends radially above said groove less than the concave surface extends above the plane passing on the surface said leg portions when in the free state, whereby when mounted in said groove and in contact with said bore all of the concave surface does not contact the base of said groove until hydraulic pressure is applied to the apparatus.

References Cited

UNITED STATES PATENTS

| | | | |
|---|---|---|---|
| 2,208,620 | 7/1940 | Baisch | 277—177 |
| 2,684,861 | 7/1954 | Loeffler | 277—206 X |
| 2,783,068 | 2/1957 | Bloom et al. | 277—177 |
| 3,175,833 | 3/1965 | Morse | 277—205 |
| 3,052,476 | 9/1962 | Workman | 277—177 X |

SAMUEL ROTHBERG, *Primary Examiner.*